United States Patent Office 3,042,631
Patented July 3, 1962

3,042,631
POLYURETHANE PREPOLYMER AND EXPANDED PRODUCT PREPARED THEREFROM
Carl V. Strandskov, Chicago, Ill., assignor to Simoniz Company, a corporation of Delaware
No Drawing. Filed Aug. 3, 1956, Ser. No. 602,065
4 Claims. (Cl. 260—2.5)

This invention relates to expanded material comprising polyurethanes.

One of the features of this invention is to provide an improved expanded polyurethane material in the form of an expanded porous product that is essentially hydrophilic and permanently soft and resilient by reacting a polyglycol essentially of the formula $$HO(C_2H_4O)_a(C_3H_6O)_b(C_2H_4O)_cH$$

having an average molecular weight of about 1,000–12,000 and about 5–95% oxyethylene content, a molar excess of a polyisocyanate, and a polyfunctional compound prepared by the sequential addition of propylene oxide and then ethylene oxide to an alkylene diamine.

A specific feature of the invention is to provide such a material by reacting a polyglycol essentially of the formula $$H(C_2H_4O)_a(C_3H_6O)_b(C_2H_4O)_cH$$

having an average molecular weight of about 2,000 and having an oxyethylene content of about 45%, a tolylene diisocyanate in molar excess up to about 12.5 mols of said isocyanate per mol of glycol, and about 1–35% by by weight of a polyfunctional compound essentially of the formula

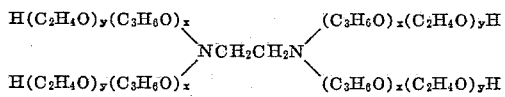

having a molecular weight of about 3700 and an oxyethylene content of about 25%.

Other features and advantages of the invention will be apparent from the following description of the invention including certain typical embodiments thereof.

Synthetic sponges for use in cleaning as well as for other purposes have been made in the past from a number of materials, such as cellulose, rubber, polyvinyl compounds, and others. Each of these prior expanded materials has certain inherent disadvantages. Thus the cellulose sponge is fairly easily torn either by twisting or by abrasion. The chief disadvantage of a rubber sponge is that the rubber is hydrophobic and is also relatively weak in twist and in resisting abrasion. The expanded material of this invention avoids many of these disadvantages.

In producing the foamed materials of this invention, a molar excess of a polyisocyanate, and preferably a diisocyanate, is reacted with a polyglycol essentially of the formula $$HO(C_2H_4O)_a(C_3H_6O)_b(C_2H_4O)_cH$$

having an average molecular weight of about 1,000–12,000 and about 5–95% oxyethylene content in which $a$ and $c$ each has an average value of about 1–100, preferably about 5–20, and $b$ has an average value of about 10–45 and preferably 15–35, and a polyfunctional compound prepared by the sequential addition of propylene oxide and then ethylene oxide to an alkylene diamine, preferably an ethylene diamine, to produce a prepolymer. A small amount of water is added to this prepolymer, after which the mixture is immediately placed in a mold of the desired size and shape and permitted to react for a variable period of time during which the prepolymer foams and this foam sets to a soft, resilient hydrophilic sponge material.

Thus, this method basically includes three general steps. In the first, the polyurethane prepolymer is formed by reacting the excess of diisocyanate with the polyglycol and polyfunctional compound. In the second step the polyurethane is foamed such as by adding water to produce a stabilized foamed structure. In the third step the foam structure is cured by permitting it to set over a variable period of time during which the foam structure becomes strong and resilient.

Any diisocyanate having the general formula $$OCN\text{---}R\text{---}NCO$$

in which R is an organic radical having two valences available to which the two NCO groups are attached may be used. The diisocyanate is used in molar excess up to about 12 mols of the diisocyanate for each mol of polyglycol. In the preferred process for each mol of polyglycol about 3–6 mols of diisocyanate per mol of polyglycol are used.

In the initial reaction between the diisocyanate, the polyglycol and the polyfunctional compound, the reactants are maintained at a temperature preferably between about 25–150° C. for a period of time that may vary from a minimum of about 5–10 minutes up to several hours, for example about 36 hours or more, and may be for as much as several weeks. The product is in the form of cross-linked linear chains with each chain having an NCO group at each end because of the excess of the diisocyanate that is present.

The alkylene diamine compound has four active hydrogen groups in the molecule and operates as a polyfunctional compound. This polyfunctional compound is preferably of the formula

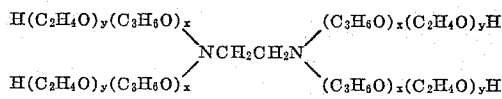

having an average molecular weight of about 2,000–12,000 and an oxyethylene content of about 5–95% in which $x$ has an average value of about 2–20 and $y$ has an average value of about 1–50. This polyfunctional compound is added in a preferred amount of about 1–30% by weight. The polyfunctional compound, as can be seen from the above representative structural formula, contains the polyfunctional active hydrogen-containing groups in branches. These polyfunctional compounds serve as cross-linking agents and also serve as catalysts in promoting the reaction.

At the end of the reaction, water is added in a very small amount, preferably ranging between about 0.5 and 10% by weight of the combined weights of the polyglycol and the diisocyanate. This water causes a further reaction with the release of carbon dioxide throughout the reacting mass to form the foam. The reaction product then reacts with more diisocyanate from the initial reaction mixture to form cross-linkages. Then, upon setting or aging, further reactions and cross-linkages occur.

As can be seen from the above description, there are many diisocyanates that are usable to make the polyurethane prepolymer. This is true because the active groups of the compound are the two isocyanate groups. The organic radical to which the isocyanate groups are attached does not enter into the reaction. Thus, about the only limitation on this organic group is that it not be reactive to either the polyglycol, water, or any other reacting material, reaction product, or material in contact with the reactants and reaction products. Among the diisocyanates that may be used, tolylene diisocyanate including the mixed isomers thereof is greatly preferred.

The polyglycols of this invention which form a linear chain with the polyisocyanates and which have the above structural formula are represented by the Pluronics. The Pluronics are made by Yyandotte Chemicals Corporation of Wyandotte, Michigan. These Pluronics are linear compounds in which water-soluble polyoxyethylene groups are at both ends of a polyoxypropylene chain. The preferred Pluronics are those of a molecular weight of at least about 1,000 up to a molecular weight of about 12,000 and containing about 5–95%, and preferably between about 5–70% polyoxyethylene groups in the molecule.

In forming the prepolymer it is preferred that the reaction be conducted in an acid medium. Thus, it is preferred that the pH of the reaction mixture be 6 or less and preferably about 4–6. This acid condition slows the reaction rate somewhat to make it more easily controlled, improves the tensile strength of the resulting foamed material, and reduces uncontrolled cross-linking. In producing this acid condition, any anhydrous inorganic or organic acid may be used except that the carboxylic acids are preferably not employed as they tend to react with the isocyanates to liberate carbon dioxide.

The alkylene diamine, and preferably ethylene diamine, polyfunctional compounds have the active hydrogen-containing branches of considerably greater length than the body of the compound. These polyfunctional compounds are preferably the Tetronics, also produced by Wyandotte Chemicals Corporation of Wyandotte, Michigan. The Tetronics are produced by the sequential addition of propylene oxide and ethylene oxide to ethylene diamine. They may be considered as ethylene diamine type Pluronics where polypropylene oxide is added to each of the four reactive hydrogens of the ethylene diamine and to which subsequently ethylene oxide is added.

In preparing the prepolymer it is preferred that a catalyst and foam stabilizer be added. This compound is not absolutely required but is greatly preferred. These include tertiary amines such as N-methyl morpholine, triethanol amine, ethyl diethanolamine, dimethyl amino dihydroxy propane, dimethyl amino propane, diethyl ethanolamine, and the like. Urea is the preferred catalyst. The catalyst is preferably used in an amount of about 0.25–10% based on the amount of the combined polyglycol and diisocyanate.

While adjusting the pH to the acid side as previously described so as to limit cross-linking during the formation of the prepolymer, a certain degree of branching is desirable in order to produce a stable sponge. This controlled cross-linking is accomplished by the use of the polyfunctional compound which contains more than two active hydrogen atoms.

If it is necessary to reduce the viscosity of the prepolymer composition in order that it may be handled easily, a solvent may be used. Any of the ordinary solvents for polyurethanes are workable that are not, of course, reactive with the ingredients in the prepolymer mixture. Excellent solvents are dichlorobenzene and carbitol acetate. The solvent is preferably used up to about 15% by weight of the combined polyglycol and diisocyanate.

As a foaming agent, water is preferably employed. This may be added as such or may be added in the form of an aqueous solution of one of the ingredients. Thus, where urea is used, the water may be a part of an aqueous solution of the urea.

After the polyurethane has been formed, it may be foamed immediately by adding water as previously described or may be stored in unfoamed dry condition for later foaming. The rate of foaming depends on many factors including the temperature of the reaction mixture, the relative amount of excess diisocyanate, the amount of water used, and other factors. Thus, when the water is added to the polyurethane at room temperature, the foaming is relatively slow. When water is added at elevated temperatures the foaming is quite rapid. The preferred temperature is from about 20–100° C.

The methods and the products of this invention are illustrated by the following examples in which the parts and proportions indicated are by weight unless otherwise noted:

Example 1

| | Pts. by wt. |
|---|---|
| Pluronic L 44 | 35 |
| Tetronic 702 | 10 |
| $H_2SO_4$ | 0.4 |
| Hylene TM | 18 |
| 50% aqueous urea | 4.5 |

The first four ingredients were mixed in the order listed. This mixture was then heated in a 75° C. oven for one hour, after which it was cooled to about 25° C. The aqueous urea was then mixed in vigorously until the foaming started. This mixing time was between about 10 and 20 seconds. The foam reached full volume in about 1–2 minutes, and the foam was permitted to cure by being subjected to this temperature for about 30 minutes. The foamed product was then removed from the mold.

The Pluronic L 44 has the above described polyglycol structural formula and has a molecular weight of about 2,000, a base weight of about 1,100, and an oxyethylene content of about 45%. The Tetronic 702 has the above described polyfunctional compound structural formula and has a molecular weight of about 3680, a base weight of about 2750, and an oxyethylene content of about 25%.

Example 2

| | Pts. by wt. |
|---|---|
| Pluronic L 42 | 20 |
| Tetronic 702 | 5 |
| $H_2SO_4$ | 0.2 |
| Hylene TM | 12 |
| 50% aqueous urea | 2.4 |

The first four ingredients were again mixed in the order listed and heated in a 50° C. oven for 1 hour and then cooled to 25° C. The aqueous urea was added with vigorous mixing until foaming started. As soon as the foaming was completed, the foam was cured by permitting it to remain in the mold until the foam had become a solid foam structure.

Here the Pluronic L 42 has a molecular weight of about 1460, a base weight of about 1100, and an oxyethylene content of about 25%.

Example 3

| | Pts. by wt. |
|---|---|
| Pluronic P 75 | 45 |
| Tetronic 702 | 9 |
| Sulfuric acid | 0.3 |
| Hylene TM | 18 |
| 50% aqueous urea | 3.5 |

The first four ingredients were mixed in the order listed. This mixture was then heated in a 100° C. oven for 1 hour, after which it was cooled to about 25° C. The aqueous urea was then mixed in vigorously until the foaming started. As soon as the foaming was completed, the foam was again cured by permitting it to remain in the mold until the foam had become a solid foam structure.

The Pluronic P 75 has a molecular weight of about 4550, a base weight (the molecular weight of the polyoxypropylene portion of the molecule) of about 1950, and an oxyethylene content of about 55%.

Example 4

| | Pts. by wt. |
|---|---|
| Pluronic L 62 | 35 |
| Tetronic 704 | 10 |
| Sulfuric acid | 0.3 |
| Hylene TM | 16 |
| 50% aqueous urea | 5.5 |

The first four ingredients were mixed in the order listed. This mixture was then heated in a 75° C. oven for 1 hour, after which it was cooled to about 25° C. The aqueous urea was then mixed in vigorously until the foaming started. As soon as the foaming was completed, the foam was cured by permitting it to remain in the mold until it had become a solid foam structure.

The Pluronic L 62 has a molecular weight of about 2200, a base weight of about 1650, and an oxyethylene content of about 25%. The Tetronic 704 has a molecular weight of about 5000, a base weight of about 2750, and an oxyethylene content of about 45%.

The preferred polyisocyanate is tolylene diisocyanate. Hylene TM is an 80–20 mixture of 2,4- and 2,6-mixed isomers of tolylene diisocyanate. Other diisocyanates as listed above may be used if desired.

In preparing the products of this invention, it is preferred that an anti-oxidant be used. An excellent anti-oxidant is 2,5-ditertiary butyl hydroquinone. It is preferably added to the initial reactants in an amount of between about 0.5–2% by weight.

If desired, mixtures of the polyglycols, of the polyisocyanates, and of the polyfunctional compounds may be used. Furthermore, various resins, plasticizers, coloring agents, fillers, and the like may be employed.

The foregoing detailed description is given for clearness of understanding only and no unnecessary limitations should be understood therefrom as modifications will be obvious to those skilled in the art.

I claim:

1. An expanded porous resin product comprising the foamed conjoint reaction product of a polyalkylene ether glycol essentially of the formula $$HO(C_2H_4O)_a(C_3H_6O)_b(C_2H_4O)_cH$$

having an average molecular weight of about 1,000–12,000 and about 5–95% oxyethylene content in which $a$ and $c$ each has an average value of about 5–20 and $b$ has an average value of about 15–35, a molar excess of an organic diisocyanate in a molar ratio up to about 12.5 mols of said diisocyanate per mol of glycol, and about 1–35% by weight of a compound essentially of the formula

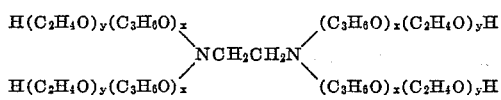

having an average molecular weight of about 2,000–12,000 and an oxyethylene content of about 5–95% and in which $x$ has an average value of about 2–20 and $y$ has an average value of about 1–50, to form a prepolymer, followed by the reaction of this prepolymer with water in an amount of about 0.5–10% by weight of the glycol and diisocyanate.

2. A resin product comprising the conjoint reaction product of a polyalkylene ether glycol essentially of the formula $HO(C_2H_4O)_a(C_3H_6O)_b(C_2H_4O)_cH$ having an average molecular weight of about 1,000–12,000 and about 5–95% oxyethylene content in which $a$ and $c$ each has an average value of about 5–20 and $b$ has an average value of about 15–35, a molar excess of an organic diisocyanate in a molar ratio up to about 12.5 mols of said diisocyanate per mol of glycol, and about 1–35% by weight of a compound essentially of the formula

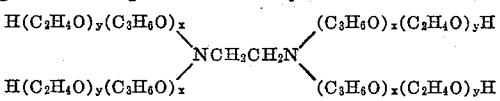

having an average molecular weight of about 2,000–12,000 and an oxyethylene content of about 5–95% and in which $x$ has an average value of about 2–20 and $y$ has an average value of about 1–50, said product being capable of reacting with water in an amount of about 0.5–10% by weight of the glycol and diisocyanate to form a foamed resin product.

3. An expanded porous resin product which has been prepared by reacting water with a prepolymer, said prepolymer being the conjoint reaction product of (1) a polyoxypropylene - polyoxyethylene glycol, (2) an N,N,N',N' tetrakis (polyoxyethylene-polyoxypropylene) ethylene diamine and (3) a molar excess of toluene diisocyanate.

4. A resin prepolymer capable of reacting with water to form an expanded porous resin which comprises the conjoint reaction product of (1) a polyoxypropylene-polyoxyethylene glycol, (2) an N,N,N',N' tetrakis (polyoxyethylene-polyoxypropylene) ethylene diamine and (3) a molar excess of toluene diisocyanate.

References Cited in the file of this patent

UNITED STATES PATENTS

| | | |
|---|---|---|
| 2,726,219 | Hill | Dec. 6, 1955 |
| 2,764,565 | Hoppe et al. | Sept. 25, 1956 |
| 2,764,566 | Simon et al. | Sept. 25, 1956 |

FOREIGN PATENTS

| | | |
|---|---|---|
| 733,624 | Great Britain | July 13, 1955 |
| 164,975 | Australia | Sept. 5, 1955 |